(12) United States Patent
King, Jr. et al.

(10) Patent No.: US 8,018,089 B2
(45) Date of Patent: Sep. 13, 2011

(54) SYSTEM CONTROLLER FOR INTEGRATED LIGHTING CONTROL PANELS

(75) Inventors: William A King, Jr., Loganville, GA (US); Martin Brucherseifer, Decatur, GA (US); Seshagiri R Marellapudi, Norcross, GA (US); Paul Terricciano, Roswell, GA (US); John DeBoer, Decatur, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 664 days.

(21) Appl. No.: 11/635,358

(22) Filed: Dec. 7, 2006

(65) Prior Publication Data

US 2008/0084114 A1 Apr. 10, 2008

Related U.S. Application Data

(60) Provisional application No. 60/826,687, filed on Sep. 22, 2006.

(51) Int. Cl.
*H02J 3/14* (2006.01)
(52) U.S. Cl. ............................ 307/31; 307/38; 700/19
(58) Field of Classification Search ............. 700/19; 200/331; 307/31, 38
See application file for complete search history.

(56) References Cited

U.S. PATENT DOCUMENTS

| 5,185,705 | A  | * | 2/1993  | Farrington ........... 700/292 |
| 6,469,457 | B2 | * | 10/2002 | Callahan ............. 315/294 |
| 6,813,525 | B2 | * | 11/2004 | Reid et al. ............ 700/19 |
| 7,386,424 | B2 | * | 6/2008  | DeBoer et al. ........ 702/188 |
| 7,566,986 | B2 | * | 7/2009  | DeBoer et al. ........ 307/31  |
| 2006/0071559 | A1 | * | 4/2006 | Hanson et al. ........ 307/43 |
| 2006/0174145 | A1 |   | 8/2006 | Chapuis et al. |
| 2007/0064360 | A1 | * | 3/2007 | DeBoer et al. ........ 361/62 |
| 2007/0064377 | A1 | * | 3/2007 | DeBoer et al. ........ 361/637 |
| 2008/0077280 | A1 | * | 3/2008 | DeBoer et al. ........ 700/295 |
| 2008/0077360 | A1 | * | 3/2008 | DeBoer et al. ........ 702/188 |
| 2008/0084114 | A1 | * | 4/2008 | Brucherseifer et al. ... 307/38 |
| 2008/0084115 | A1 | * | 4/2008 | King et al. ........... 307/38 |
| 2008/0084116 | A1 | * | 4/2008 | Terricciano et al. ..... 307/39 |
| 2008/0084644 | A1 | * | 4/2008 | King ................ 361/102 |
| 2008/0084648 | A1 | * | 4/2008 | King ................ 361/160 |
| 2008/0086579 | A1 | * | 4/2008 | Williams et al. ....... 710/61 |
| 2008/0125888 | A1 | * | 5/2008 | Marellapudi et al. .... 700/90 |
| 2008/0126315 | A1 | * | 5/2008 | Balasubramaniam et al. ... 707/3 |

FOREIGN PATENT DOCUMENTS

| WO | WO 96/02082 A | 1/1996 |
| WO | WO 96/08784 | 3/1996 |

OTHER PUBLICATIONS

Digital Lighting Systems, Inc. PD804-DMX User's Manual, Rev. B, May 2003.*

* cited by examiner

*Primary Examiner* — Jared Fureman
*Assistant Examiner* — Daniel Cavallari
(74) *Attorney, Agent, or Firm* — Jose R. de la Rosa

(57) ABSTRACT

An electrical distribution system is provided for selectively connecting an electrical power source to load devices comprising a plurality of panelboards each having a plurality of load circuit positions. A plurality of pairs of circuit breakers and switching devices are each mounted in one of the load circuit positions. Each pair is electrically connected between an electrical power source and a load device for selectively delivering electrical power to load devices. An I/O controller is mounted in the panelboard for controlling operation of the switching devices. The I/O controller includes a communication circuit. A system controller is connected to each I/O controller communication circuit and comprises a programmed controller for commanding operation of the I/O controllers.

20 Claims, 7 Drawing Sheets

SYSTEM CONTROLLER FOR INTEGRATED LIGHTING CONTROL PANELS

CROSS REFERENCE TO RELATED APPLICATIONS

This application claims priority of provisional application No. 60/826,687 filed Sep. 22, 2006, the contents of which is incorporated by reference herein.

FIELD OF THE INVENTION

This invention relates generally to residential and commercial electrical power distribution panels and components, and more particularly, to a system controller for integrated distribution panels in an electrical power distribution system.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

Typically, a power distribution such as a lighting control panel includes local control of the individual switch units. In a stand alone system, a control module is incorporated in the panel for controlling the individual switch devices. With a plurality of panels, such systems use a single control module for the plurality of panels. As such, operation of the individual panels can be dependent on a single control module such that failure of the control module or communications between panels, can interfere with proper operation.

The present invention is directed to improvements in electrical distribution systems, such as lighting control panels

SUMMARY OF THE INVENTION

In accordance with the invention, there is provided an electrical distribution system including an integrated system controller capable of controlling a plurality of electrical distribution panels.

In accordance with one aspect of the invention, there is disclosed an electrical distribution system for selectively connecting an electrical power source to load devices. The system comprises a plurality of panels. Each panel comprises a plurality of switching devices mounted in the panel. Each switching device is for connection in a branch circuit to a load device for selectively delivering electrical power to the load device. An input/output (I/O) controller is mounted in the panel and is operatively connected to each of the switching devices for controlling operation of the switching devices. The I/O controller includes a communication circuit. A system controller is connected to each I/O controller communication circuit and comprises a programmed controller for commanding operation of the I/O controller.

It is a feature of the invention that the system controller is operable to independently configure operation of each of the I/O controllers.

It is another feature of the invention that the system controller is operable to download switching schedules to each of the I/O controllers.

It is a further feature of the invention that the system controller is operable to download commands to each of the I/O controllers to control operation of individual select ones of the plurality of remote operated devices.

It is still a further feature of the invention that the system controller is operable to download commands to each of the I/O controllers to control operation of a plurality of the remote operated devices in a zone configuration.

It is still another feature of the invention that the system controller receives status information from each of the I/O controllers indicating operating condition of the plurality of remote operated devices.

It is yet another feature of the invention that the system controller comprises a user interface for configuring operation of the I/O controllers. The user interface may display information from the plurality of panels in a graphical display.

It is still a further feature of the invention that the system controller is mounted in one of the plurality of panels.

It is an additional feature of the invention that the programmed controller comprises a communication circuit for communication with external networks.

There is disclosed in accordance with another aspect of the invention an electrical distribution system for selectively connecting an electrical power source to load devices comprising a plurality of panelboards each having a plurality of load circuit positions. A plurality of pairs of circuit breakers and switching devices are each mounted in one of the load circuit positions. Each pair is electrically connected between an electrical power source and a load device for selectively delivering electrical power to load devices. An I/O controller is mounted in the panelboard for controlling operation of the switching devices. The I/O controller includes a communication circuit. A system controller is connected to each I/O controller communication circuit and comprises a programmed controller for commanding operation of the I/O controllers.

Further features and advantages of the invention will be readily apparent from the specification and from the drawings.

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, using an integrated system controller. Control may include on/off switching, dimming and metering. The electrical distribution system may be as is generally described in U.S. application Ser. No. 11/519,727, filed Sep. 12, 2006, the specification of which is incorporated by reference herein.

Figure 1:
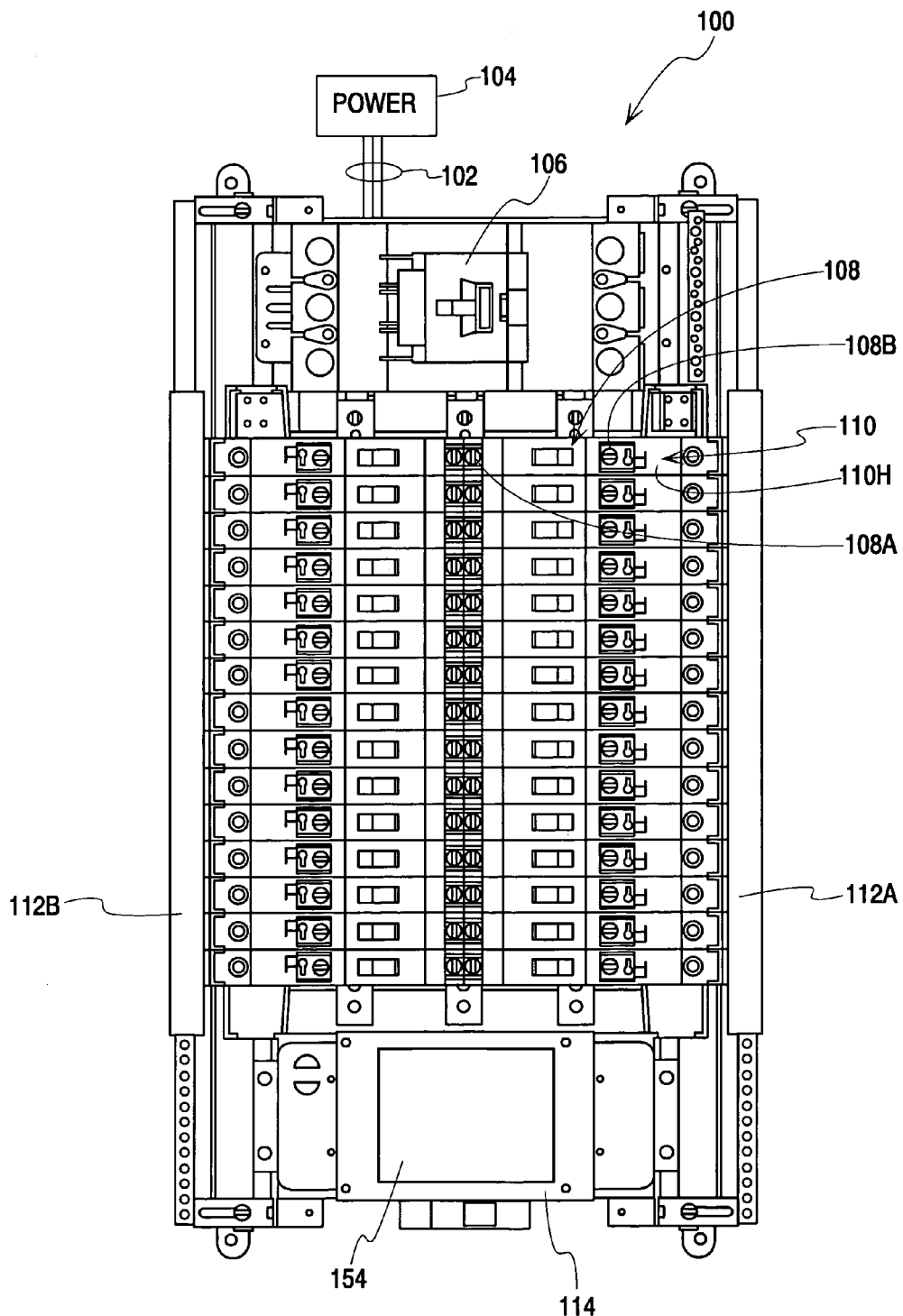
FIG. 1 is an elevation view of a power distribution panel according to the invention.

Referring to FIG. 1, a lighting control system in accordance with the invention comprises a lighting control panel 100. The panel 100 may comprise a Siemens type P1panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty-two individual circuit breakers 108, although only thirty are shown in the embodiment of FIG. 1. Each circuit breaker may be of conventional construction and may be, for example, a Siemens BQD circuit breaker. Each circuit breaker 108 includes a line terminal 108A receiving power from the main breaker 106 and a load terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts that can be remotely operated to open and close a lighting circuit. The device 110 is attached to the load side of a circuit breaker 108 within a panel 100 using a conductor tab, i.e, the terminal 110A, inserted into the breaker lug 108B. The load terminal 110B comprises a lug of the same size as the breaker lug 108B for connecting to a wire to be connected to the load device. The device housing 110H is configured to mount in a Siemens type P1 panelboard, although the invention is not limited to such a configuration.

Figure 2:
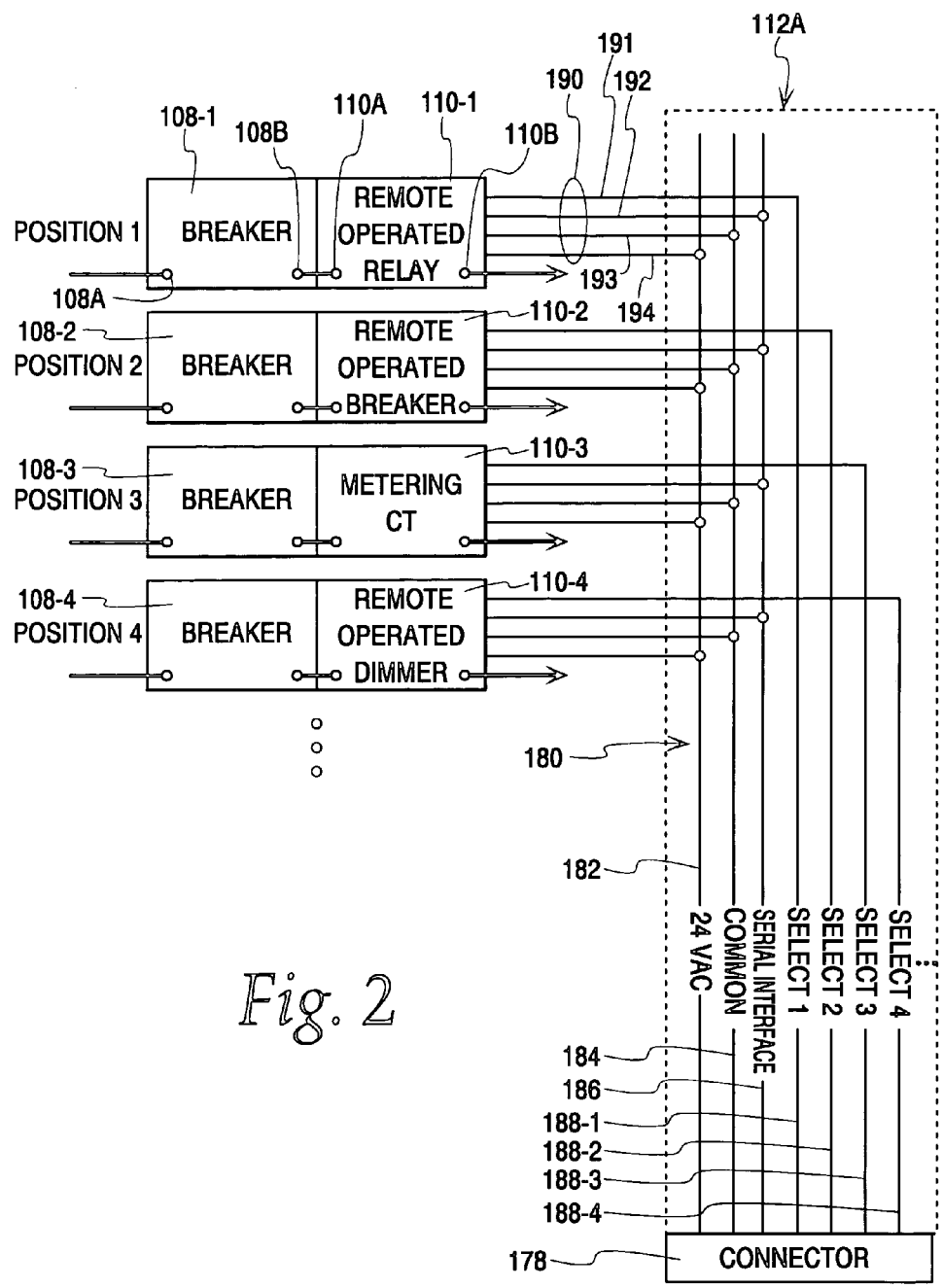
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device 110-3 comprises a current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
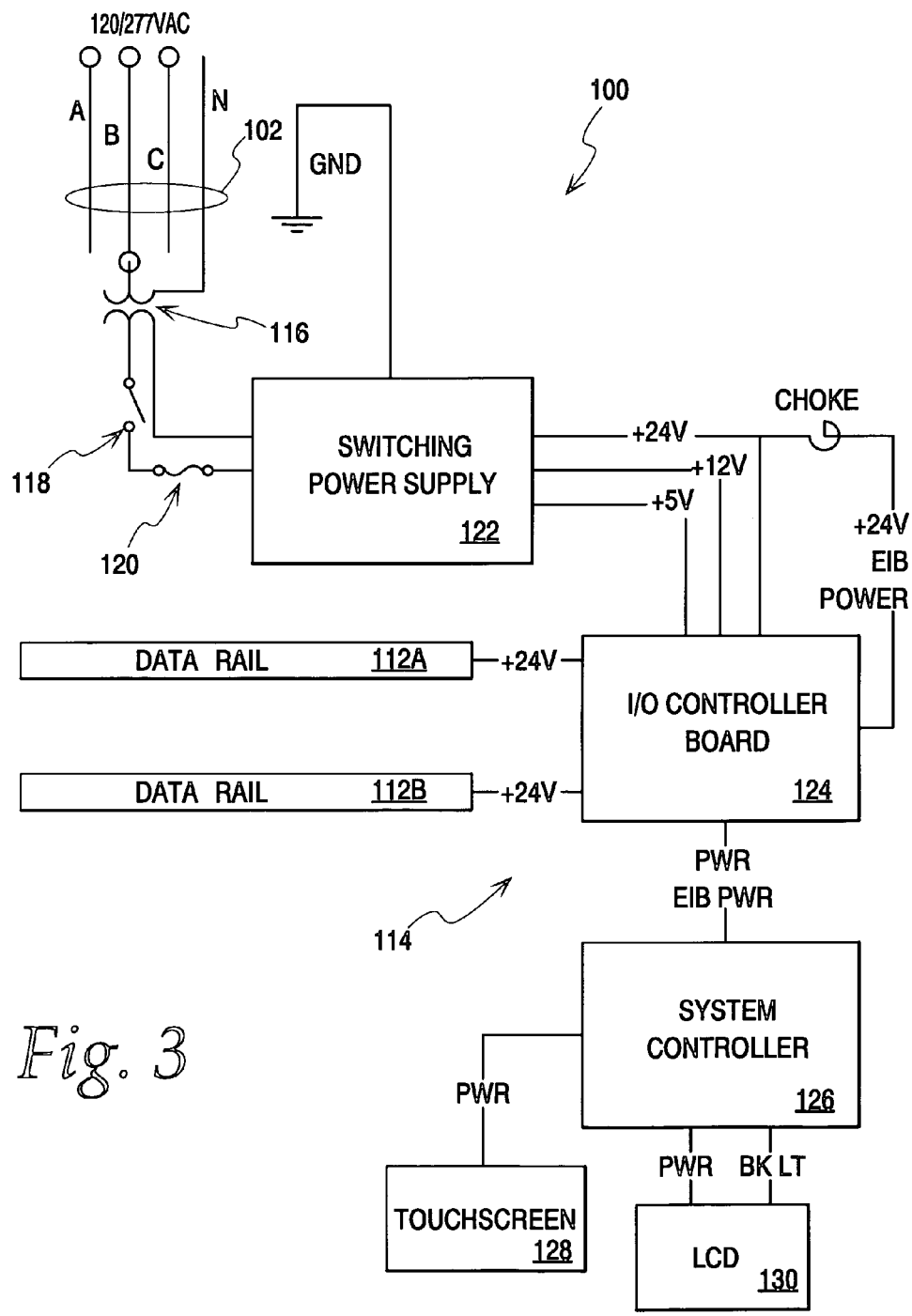
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. The power supply 122 provides isolated power to all of the control components including the I/O controller board 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
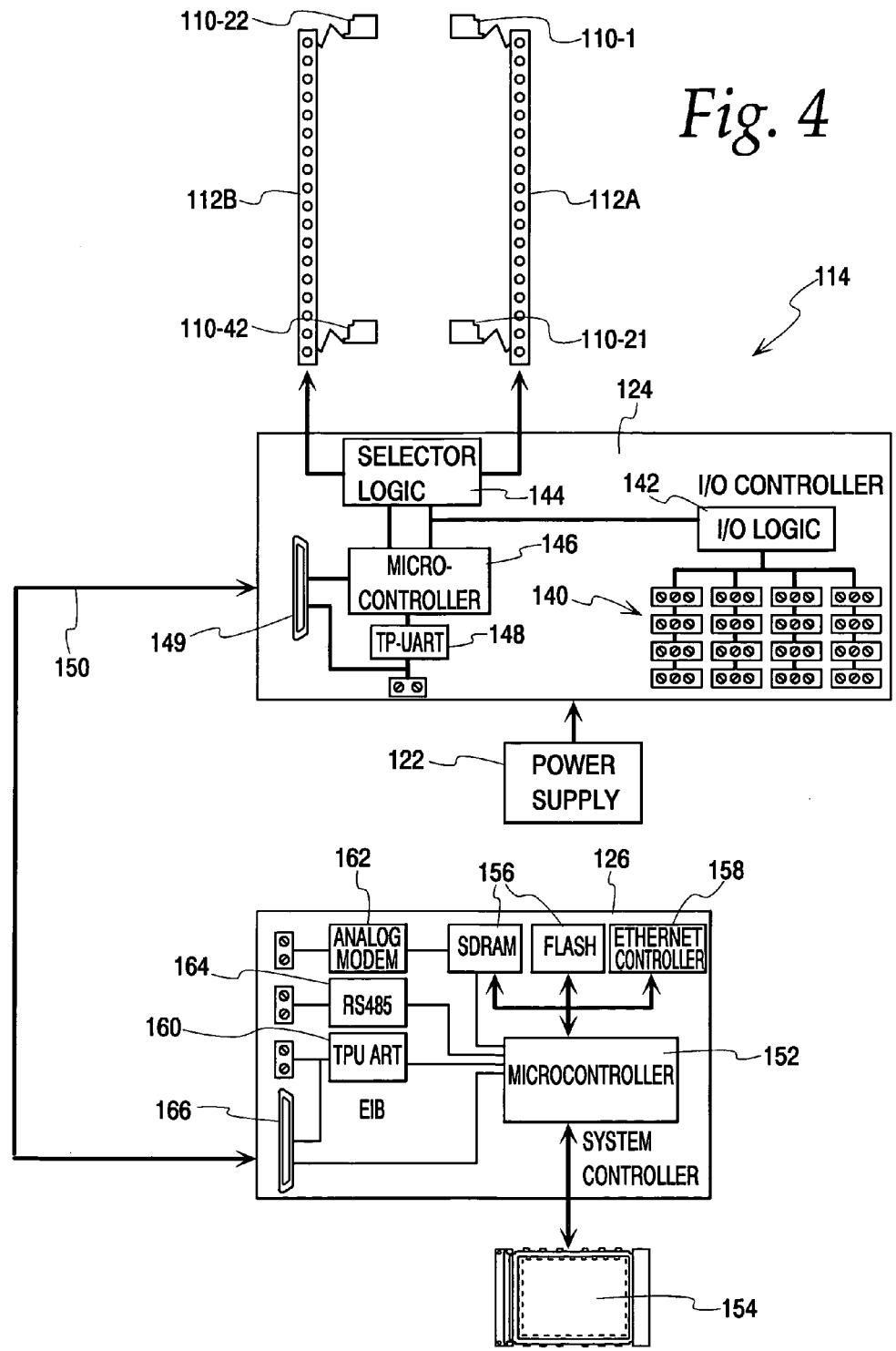
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 112A and 112B to the remote operated devices, four of which, 110-1, 110-21, 110-22 and 110-42, are illustrated. A user interface and high level scheduling and control are provided by the system controller 126.

The I/O controller 124 provides discrete inputs to the controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a user interface 154 in the form of an integrated touch screen 128 and LCD 130, see FIG. 3. The microprocessor 152 is also connected to memory devices 156 and an ethernet controller 158. A TP-UART circuit 160 provides an EIB interface while additional interfaces are provided via an analog modem 162 and RS 485 interface circuit 164. A connector 162 is provided for connection to the cable 150.

Figure 5:
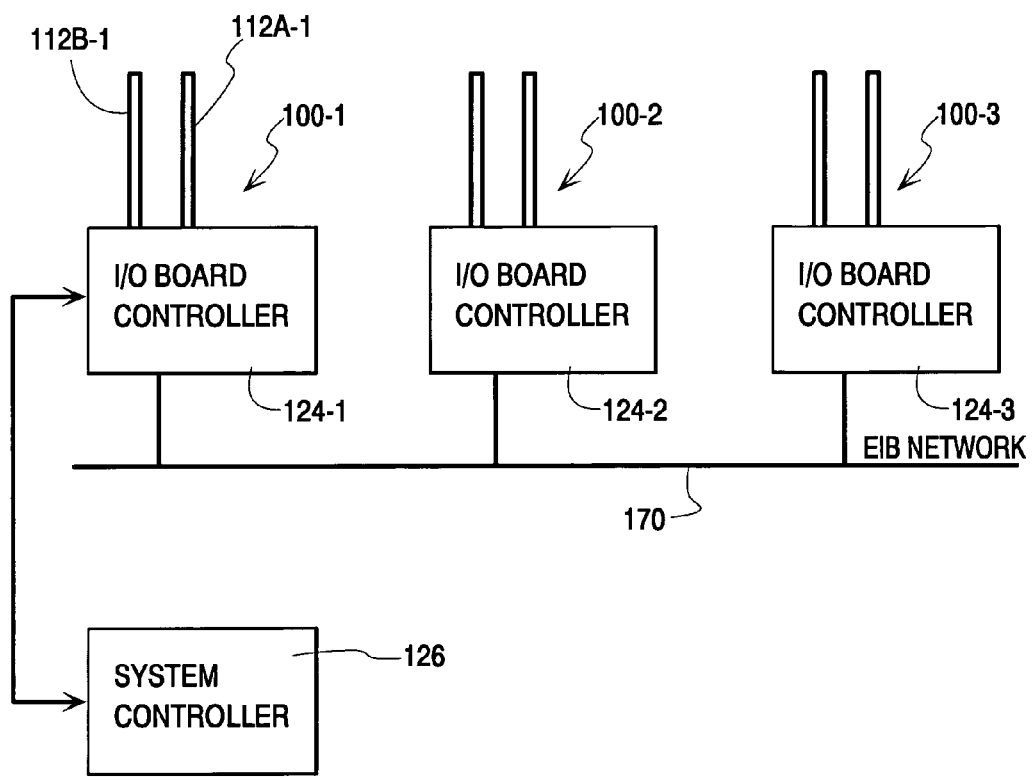
FIG. 5 is block diagram of a multiple panel system in accordance with the invention.

In another embodiment, shown in FIG. 5, multiple lighting control panels 100-1, 100-2 and 100-3 are configured to work as a single unit with the first panel 100-1 being configured as a master, and the other panels 100-2 and 100-3 configured as slaves. To configure the first panel 100-1 as a master, the system controller 126 is used, as described above relative to FIG. 4. The slave panels 100-2 and 100-3 contain no system controller. Instead, an EIB bus 170 interconnects the I/O controller boards 124-1, 124-2 and 124-3 to receive commands from the system controller 126.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller board 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to a printed circuit board 180 included traces defined as follows. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines are used by the I/O controller 124 to select single remote operated devices to communicate via the serial interface trace 186. For example, when the first select line 188-1 is asserted, the first remote operated device 110-1 listens for messages on the serial interface line 186. Conversely, messages on the serial interface 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

Figure 6:
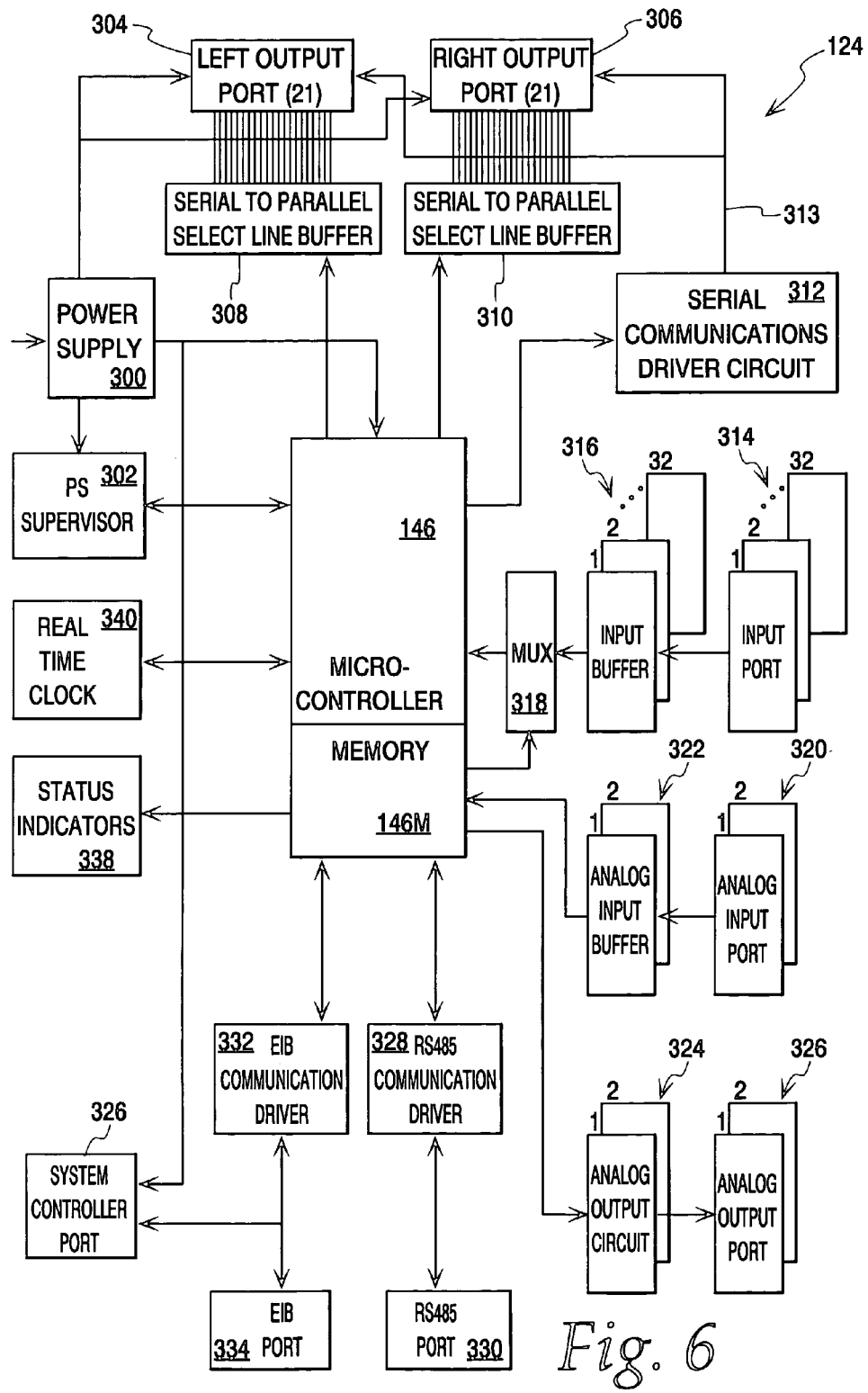
FIG. 6 is a detailed block diagram of the I/O controller of FIG. 3.

Referring to FIG. 6, the circuitry for the I/O controller 124 is illustrated in greater detail in block diagram form. The I/O controller 124 is powered from the external power supply 122, see FIG. 3, that feeds a power supply 300. The power supply 300 produces the voltages needed by the microcontroller 146 and all the other circuits making up the I/O controller 124. The microcontroller 146 may, for example, comprise a TI MSP430 microcontroller and associated memory 146M, such as flash memory or ROM memory, for strong operating programs and data, as is conventional. A power supply supervisor 302 monitors voltage and sends a reset to the microcontroller 146 if a voltage falls out of tolerance. The forty two outputs for the individual remote operated devices 110, see FIG. 2, are divided into twenty-one left side outputs at a left output port 304 and twenty-one right side outputs at a right output port 306. Serial to parallel select line buffers 308 and 310 develop separate select or enable signals for each output device 110 from the microcontroller 146 to the respective output ports 304 and 306. The two serial to parallel blocks 308 and 310 are identical so that the same clock can drive both sides, further reducing output pins needed from the microcontroller 146.

A serial communication driver circuit 312 is used to isolate and drive a single wire serial communication line 313 from the microcontroller 146 to the output ports 304 and 306. Voltage and ground from the power supply 300 are also connected to the output ports 304 and 306. The single wire communication line 313 connects to each remote operated device 110, as described above, to transmit and receive commands and data. The serial communication driver circuit 312 provides necessary isolation and protection such that in the event of an individual remote operated device failure, the remainder of the devices continued to operate properly.

The I/O controller 124 has thirty-two discrete inputs connected to input ports 314. Each input port 314 is individually protected, conditioned, and buffered at input buffers 316 connected to the microcontroller 146 via a multiplexer 318 to allow reading eight inputs at a time. Since an input can be connected to a variety of devices, such as several different types of switches and occupancy sensors from different manufacturers, each input is read under different conditions controlled by the microcontroller 146. By reading the input twice, once with the input bias high and then again with the input bias low, the microcontroller 146 can determine a change of state regardless of whether the input is a switch contact or a positive DC voltage.

A pair of analog input ports 320 are used for reading analog inputs, such as photo cells. The ports 320 consists of three terminal connections, two analog inputs on the outside with a ground terminal in the center. The analog inputs are individually buffered at analog input buffers 322 and routed to analog inputs of the microcontroller 146. Analog outputs from the microcontroller 146 are created by sending a pulse width modulated signal to a pair of analog output circuits 324. The analog output circuits 324 converts the PWM signal to a DC voltage corresponding to the duty cycle of the PWM. The outputs are then connected to analog output port 326. The analog output ports 326 may comprise three terminals with the two analog outputs connected to the two outside terminals with a ground terminal in the center.

The illustrated I/O controller 124 includes two means of a communication. The first is a master/slave protocol using an RS485 communication drive 328 with configurable termination and bias connected to an RS485 port 330. The RS485 port 330 has both an in and out connectors for daisy chaining RS485 connections. The second form of communication is an EIB or Konnex distributed processing protocol using an EIB communication driver 332 connected to an EIB port 334. The EIB port 334 is a two pin connection for attaching a twisted pair connector. In addition, the EIB communication lines connect to a system controller port 336 along with voltage from the power supply 300. This port is used to communicate with the system controller 126 via the cable 150 connected to the connector 148, see FIG. 4, discussed above. As discussed above relative to FIG. 5, the system controller 126 configures a system of multiple panels, sets up time schedules, maps inputs to outputs, and provides other building automation functions.

The microcontroller 146 can send signals to various types of status indicators 338 such as LEDs to show communications OK, operating properly, low voltage, etc. If a time schedule has been configured in the I/O controller 124, a real time clock 340 provides the ability to activate outputs based on time of day without intervention from a system controller or other building automation system.

Each lighting control panel 100 is capable of stand alone operation. When a system controller 126 is connected to a network of panels 100, the panels 100 can be independently configured, mapped to switch devices in other panels, operate on changing time schedules, communicate on various building automation networks, and display information from several panels on a local graphical display.

Figure 7:
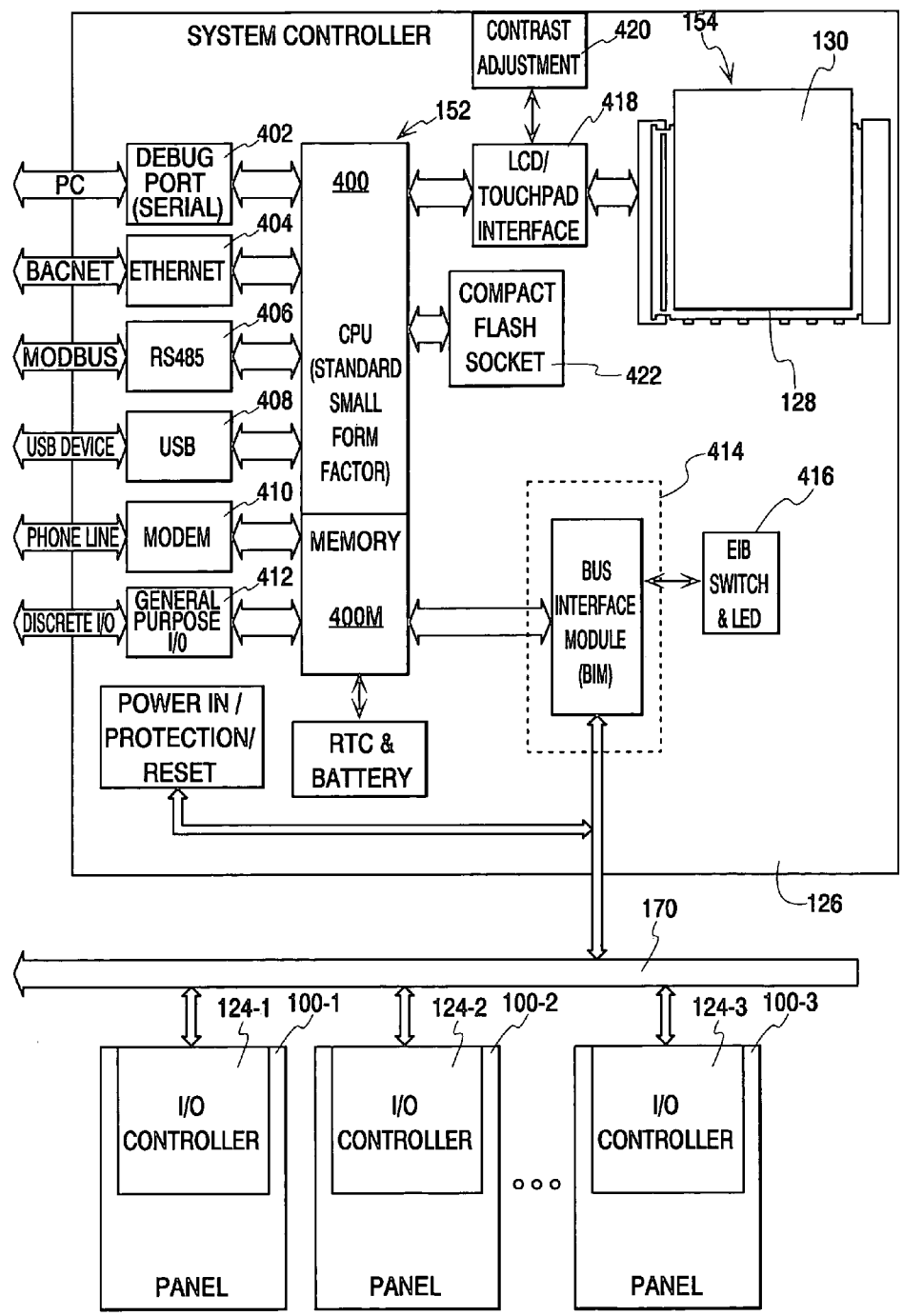
FIG. 7 is a detailed block diagram of the system controller of FIG. 3.

FIG. 7 illustrates a block diagram of the system controller 126 in a multiple panel system. The system controller 126 is controlled by the microcontroller 152 in the form of a standard form factor embedded CPU module 400 including appropriate memory circuits 400M, as is conventional. Various means for communication are provided with the system controller 126. A debug port 402 is a serial communication link similar to RS 232 used to load and debug the CPU 400. An ethernet controller 404 is capable of interfacing with Bacnet or the internet. An RS485 port 406 can be used with Modbus protocol. A USB interface 408 is provided for interfacing to a memory stick or other USB devices. A modem 410 provides for phone line communications. A general purpose I/O interface 412 is provided for special discrete I/O functions. Additionally, the CPU module 400 has a serial interface to a bus interface module (BIM) 414 used to connect to the EIB bus 170. As described, the EIB bus 170 is used as a connection means between the system controller 126 and each of the I/O controllers, such as 124A, 124B and 124C. Alternatively, with the master I/O controller, such as described above relative to FIG. 5, the system controller 126 is directly connected to the master I/O controller 124-1 and connections between I/O controllers is via the EIB bus 170. In order to configure an EIB device, an EIB switch and LED 416 are used to locate and address the device. The protocol on this bus conforms to the Konnex standard.

The CPU module 400 also includes an LCD/touch pad interface 418 for driving the user interface 154 comprising the touchscreen 128 and LCD 130, see FIG. 3. This interface 418 allows a user to interact with the system controller 126. The LCD 130 is a 5.1" diagonal monochrome graphical device. Alternatively, a color display could be used. The display 130 includes an LED back light. A contrast adjustment circuit 420 is connected to the interface 418 and may consist of a potentiometer, or the like. The touchscreen 128 is a standard four wire type device. The combination of an LCD 130 and touchscreen 128 provides improvement over use of limited keys or buttons and small text only displays.

In order to accommodate memory requirements, a compact flash socket 422 is connected to the CPU module 400 to allow for memory expansion.

The communication from the system controller 126 to an I/O controller 124, includes configuration information such as input types, output types, input/output mapping, schedules and normal group addressing information. The system controller 126 receives status information on remote operated devices 110 from the I/O controllers 124. The system controller 126 sends on and off commands to the I/O controllers 124 using group addresses in EIB. The I/O controllers 124 send input change notices to the system controller 126 when any input changes state and reports back to the system controller 126, on request, all or part of received information, for verification.

More particularly, each I/O controller microcontroller 146, see FIGS. 4 and 6, implements an I/O board application program which is a combination of standard table definitions and specialized code for handling the inputs and/or outputs. An EIB stack handles all communications with the EIB network 170 and notifies the application program of any EIB requests. Also, software is included for communicating with the remote operated devices 110.

The application program is notified when an output needs to be turned on or off. The code can then write directly to ports 304 or 306, see FIG. 6, to effect the opening/closing of a remote operated device 110. Similarly, in a cyclic loop, the application can check the status of inputs and update the appropriate EIB tables to reflect the state of the inputs. To handle multi-part activities, a scheduler is provided within the application program. The scheduler will keep track of tasks that must be accomplished either in the next cyclic loop or after a certain elapsed time or at a certain time of day.

The application program includes a set of required tables to drive the EIB stack. These tables are an address table, an association table, communication objects, and parameters for the communication objects. When a particular EIB device is programmed, these tables are downloaded and determine how the device responds to particular EIB messages. Each of the forty-two outputs need communication objects defined for at least status and force control, and optionally manual override, control and logic. The control, logic and manual override objects are driven by the discrete inputs. Thus, they may or may not need a communication object defined. Each of the thirty-two discrete inputs needs one communication object defined.

The system controller 126 functions as the configurator and master to all of the panels 100. Apart from configuration, it also tests, diagnoses, and reports device activities for each of up to eight panels 100. The system controller software runs on a window CE operating system.

A user interface application is a Windows forms application which makes calls to all the business objects on an on-demand basis. This application uses the touch panel interface 154 to drive the application. A schedule manager runs all the time and initiates necessary events when the time to trigger reaches. This object handles all events and treats them based on whether they are scheduled events or manual events. A synchronization manager is a time sync object that runs all the time and synchronizes the clocks with all of the panels 100 and the system controller 126. A communications handler accepts all requests from the user interface or from other business objects, such as the schedule manager, and dispatches these requests to the appropriate protocol handler. A group address provider provides to a caller a unique group address, keeping in kind the general group address architecture. Group addresses are used primarily for establishing zones of lights or addressing individual inputs or outputs. A physical address provider provides to a caller a unique physical address based on a given panel number. One unique physical address is assigned to each panel in a system. In general, the physical address is the unique address by which an EIB device can be programmed.

An EIB handler performs the functions of taking requests from the communication handler and sending them out to the EIB network and responding to any EIB messages received from the EIB network. The EIB handler takes a logical request from the communications handler and translates it into the appropriate message type for EIB and assigns the necessary addressing to it, based on the panel ID or on the group address. For received EIB messages, the EIB handler reverses this process, by interpreting the message type back into a generic response and translating the address into a panel ID or leaving it as a group address. Then it determines if this received message is an expected response or if it is an unsolicited response. Unsolicited responses are queued up waiting for the communication handler to ask for them.

Thus, in accordance with the invention, an integrated electrical power distribution system, such as a lighting control system, includes a system controller for plural integrated distribution panels in an electrical power distribution system. This provides each panel 100 with direct control of individual remote operated devices 110, with supervisory capability from a single system controller 126 in an integrated system.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. An electrical distribution system for selectively connecting an electrical power source to load devices, comprising:
a plurality of panels, each panel comprising a plurality of switching devices mounted in the panel, each switching device for connection in a branch circuit to a load device for selectively delivering electrical power to the load device, and an input/output (I/O) controller mounted in the panel and operatively connected to each of the switching devices, wherein the I/O controller implements standard table definitions and specialized code for directly controlling operation of the switching devices, the I/O controller including a communication circuit; and
a system controller connected to each I/O controller communication circuit and comprising a programmed controller for commanding operation of the I/O controllers.

2. The electrical distribution system of claim 1 wherein the system controller is operable to independently configure operation of each of the I/O controllers.

3. The electrical distribution system of claim 1 wherein the system controller is operable to download commands to each of the I/O controllers to control operation of individual select ones of the plurality of remote operated devices.

4. The electrical distribution system of claim 1 wherein the system controller is operable to download commands to each of the I/O controllers to control operation of a plurality of the remote operated devices in a zone configuration.

5. The electrical distribution system of claim 1 wherein the system controller comprises a user interface for configuring operation of the I/O controllers.

6. The electrical distribution system of claim 5 wherein the user interface displays information from the plurality of panels in a graphical display.

7. The electrical distribution system of claim 1 wherein the system controller is mounted in one of the plurality of panels.

8. The electrical distribution system of claim 1 wherein the programmed controller comprises a communication circuit for communication with external networks.

9. An electrical distribution system for selectively connecting an electrical power source to load devices, comprising:
a plurality of panels, each panel comprising a plurality of switching devices mounted in the panel, each switching device for connection in a branch circuit to a load device for selectively delivering electrical power to the load device, and an input/output (I/O) controller mounted in the panel and operatively connected to each of the switching devices, wherein the I/O controller develops commands for controlling operation of the switching devices, the I/O controller including a communication circuit; and a system controller connected to each I/O controller communication circuit and comprising a programmed controller for commanding operation of the I/O controllers:
wherein the system controller is operable to download switching schedules to each of the I/O controllers.

10. An electrical distribution system for selectively connecting an electrical power source to load devices, comprising:
a plurality of panels, each panel comprising a plurality of switching devices mounted in the panel, each switching device for connection in a branch circuit to a load device for selectively delivering electrical power to the load device, and an input/output (I/O) controller mounted in the panel and operatively connected to each of the switching devices, wherein the I/O controller develops commands for controlling operation of the switching devices, the I/O controller including a communication circuit; and
a system controller connected to each I/O controller communication circuit and comprising a programmed controller for commanding operation of the I/O controllers:
wherein the system controller receives status information from each of the I/O controllers indicating operating condition of the plurality of the remote operated devices.

11. An electrical distribution system for selectively connecting an electrical power source to load devices, comprising:
a plurality of panelboards each having a plurality of load circuit positions, a plurality of pairs of circuit breakers and switching devices each mounted in one of the load circuit positions, and each pair electrically connected between an electrical power source and a load device for selectively delivering electrical power to load devices, and an input/output (I/O) controller mounted in the panelboard, wherein the I/O controller implements standard table definitions and specialized code for directly controlling operation of the switching devices, the I/O controller including a communication circuit; and
a system controller connected to each I/O controller communication circuit and comprising a programmed controller for commanding operation of the I/O controllers.

12. The electrical distribution system of claim 11 wherein the system controller is operable to independently configure operation of each of the I/O controllers.

13. The electrical distribution system of claim 11 wherein the system controller is operable to download commands to each of the I/O controllers to control operation of individual select ones of the plurality of remote operated devices.

14. The electrical distribution system of claim 11 wherein the system controller is operable to download commands to each of the I/O controllers to control operation of a plurality of the remote operated devices in a zone configuration.

15. The electrical distribution system of claim 11 wherein the system controller comprises a user interface for configuring operation of the I/O controllers.

16. The electrical distribution system of claim 15 wherein the user interface displays information from the plurality of panelboards in a graphical display.

17. The electrical distribution system of claim 11 wherein the system controller is mounted in one of the plurality of panelboards.

18. The electrical distribution system of claim 11 wherein the programmed controller comprises a communication circuit for communication with external networks.

19. An electrical distribution system for selectively connecting an electrical power source to load devices, comprising:
a plurality of panelboards each having a plurality of load circuit positions, a plurality of pairs of circuit breakers and switching devices each mounted in one of the load circuit positions, and each pair electrically connected between an electrical power source and a load device for selectively delivering electrical power to load devices, and an input/output (I/O) controller mounted in the panelboard, wherein the I/O controller develops commands for controlling operation of the switching devices, the I/O controller including a communication circuit; and
a system controller connected to each I/O controller communication circuit and comprising a programmed controller for commanding operation of the I/O controllers:
wherein the system controller is operable to download switching schedules to each of the I/O controllers.

20. An electrical distribution system for selectively connecting an electrical power source to load devices, comprising:
a plurality of panelboards each having a plurality of load circuit positions, a plurality of pairs of circuit breakers and switching devices each mounted in one of the load circuit positions, and each pair electrically connected between an electrical power source and a load device for selectively delivering electrical power to load devices, and an input/output (I/O) controller mounted in the panelboard, wherein the I/O controller develops commands for controlling operation of the switching devices, the I/O controller including a communication circuit; and
a system controller connected to each I/O controller communication circuit and comprising a programmed controller for commanding operation of the I/O controllers;
wherein the system controller receives status information from each of the I/O controllers indicating operating condition of the plurality of the remote operated devices.

* * * * *